(12) United States Patent
Tanaka (10) Patent No.: US 9,501,403 B2
(45) Date of Patent: Nov. 22, 2016

(54) ELECTRONIC APPARATUS IMPLEMENTED WITH MICROPROCESSOR WITH REWRITABLE MICRO PROGRAM AND METHOD TO REWRITE MICRO PROGRAM

(71) Applicant: SUMITOMO ELECTRIC INDUSTRIES, LTD., Osaka-shi, Osaka (JP)

(72) Inventor: Yasuhiro Tanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 260 days.

(21) Appl. No.: 14/186,749

(22) Filed: Feb. 21, 2014

(65) Prior Publication Data

US 2014/0244910 A1 Aug. 28, 2014

(30) Foreign Application Priority Data

Feb. 27, 2013 (JP) .................... 2013-036589

(51) Int. Cl.
G06F 13/00 (2006.01)
G06F 9/44 (2006.01)
G06F 12/02 (2006.01)
H04B 10/40 (2013.01)

(52) U.S. Cl.
CPC ........... *G06F 12/0246* (2013.01); *H04B 10/40* (2013.01); *Y02B 60/1225* (2013.01)

(58) Field of Classification Search
None
See application file for complete search history.

(56) References Cited

U.S. PATENT DOCUMENTS

2003/0200374 A1* 10/2003 Moriwaki ......... H04L 12/40013
710/305
2011/0153891 A1* 6/2011 Ebina ................ H04L 12/2814
710/110

FOREIGN PATENT DOCUMENTS

JP 2012-169745 A 9/2012

OTHER PUBLICATIONS

CFP MSA Management Interface Specification 100/40 Gigabit Transceiver Package Multi-Source Agreement Version 1.4, Jun. 22, 2010.

* cited by examiner

*Primary Examiner* — David E Martinez
(74) *Attorney, Agent, or Firm* — Global IP Counselors, LLP (57) ABSTRACT

An intelligent optical transceiver able to revise a micro program by the host system is disclosed. The optical transceiver includes a MDIO interface, a CPU, and a non-volatile memory. The host system may communicate with the CPU through an external MDIO bus, the MDIO interface, and an internal bus; while the CPU communicated with the non-volatile memory through another bus. The new micro program sent from the host system is temporarily stored in the non-volatile memory through the MDIO interface and the CPU, and finally set in the flash ROM in the CPU.

7 Claims, 11 Drawing Sheets

ELECTRONIC APPARATUS IMPLEMENTED WITH MICROPROCESSOR WITH REWRITABLE MICRO PROGRAM AND METHOD TO REWRITE MICRO PROGRAM

BACKGROUND OF THE INVENTION

1. Field of the Invention

The present application relates to an optical transceiver implemented with a microprocessor whose micro program is rewritable.

2. Background Arts

An optical transceiver, in particular, a pluggable optical transceiver may be coupled with a device in an upper layer, which is often called as the host system. Such an optical transceiver generally includes an MDIO (Management Data Input/Output) interface to communicate with the upper layer, namely the host system, and a microprocessor or a micro-controller to control, monitor and diagnose components implemented within the optical transceiver. The communication with the host system is often carried out through a serial bus, specifically, a two-wired serial bus called as I2C bus, and/or another serial bus called as the Management Data Input/Output (hereafter denoted as MDIO) bus. The MDIO interface connected to the MDIO bus is implemented with an MDIO register to store data transmitted on the MDIO bus temporarily. The MDIO interface is coupled with the microprocessor through an internal bus.

The MDIO protocol on the MDIO bus is carried out by a unit of 64 bits, which is called the MDIO frame. The configuration of the MDIO frame, which is defined in the standard of IEEE 802.3 clause 45, titled "CFP MSA Management Interface Specification", includes two-bit length operation code OP, and sixteen-bit length data/address. The host system may control the optical transceiver by setting the operation codes of ADDRESS, WRITE, READ, and auto increment address after reading (AUTO).

An optical transceiver is sometimes requested to rewrite the micro program thereof to fix bugs and/or enhance the performance after the shipment. It is preferable to rewrite the micro program through a host system on site and the MDIO interface during an ordinary operation of the optical transceiver. However, the optical transceiver and the host system periodically communicates together to send from the optical transceiver to the host system results of the monitoring and the diagnostic of the components, and/or instructions from the host system to the optical transceiver. The size of the micro program often exceeds several scores or several hundred of kilo-bytes; while, the MDIO bus only carries 16 bits (2 bytes) for data/address in one MDIO frame, which means that the transfer of the whole micro program from the host system requires a long time, during which the optical transceiver is forced to stop the ordinary operation.

Moreover, a flash ROM, which is usually built in the microprocessor to store the micro program and composed of some blocks, is necessary to erase all data in one block before a data is written in one address in the block. Accordingly, the CPU often takes a time exceeding 100 µs to write data in the flash ROM. That is, the temporary register in the MDIO interface is required to hold the data at least 100 µs. On the other hand, the communication between the MDIO interface and the host system on the MDIO bus is necessary to continue by a constant period of 16 µs or more, which is required from the standard that defines the maximum clock speed of 4 MHz (0.25 µs) and one MDIO frame has a length of 64 bits. So, the optical transceiver inevitably responds to every MDIO frame by the period of 16 µs or more. This makes two operations impossible to be executed concurrently. That is, one of operations is to transfer the data in the temporary register in the MDIO interface to the flash ROM with an elapsing time of about 100 µs or more, and another operation is to respond to the instruction of the host system within the period of 16 µs at least.

SUMMARY OF THE INVENTION

One aspect of the present application relates to an optical transceiver coupled with a host system which operates as an upper device in a system coupled through the MDIO bus; while, the optical transceiver operates as one of physical layer devices in the system. The optical transceiver of an embodiment includes a central processing unit (CPU), an MDIO interface, and a non-volatile memory. The CPU includes a random access memory (RAM) having an MDIO space accessible from the host system through the MDIO interface and a flash ROM to store a micro program which the CPU executes. The MDIO interface couples with the host system through the external MDIO bus; while, the MDIO interface couples with the CPU through the first bus. The non-volatile memory couples with the CPU through the second bus independent of the first bus. The CPU, which receives a data constituting a new micro program, stores the data in a pointer (also referred to as an address) allocated in the MDIO space accessible from the host system, and transfers the data in the pointer to the non-volatile memory through the second bus. Thus, the CPU constructs the new micro program on the non-volatile memory and, after the completion of the construction; the CPU recovers the new micro program in the flash ROM through the second bus.

Because the CPU constructs an image of the new micro program on the non-volatile memory during the CPU performs an ordinary process to control, monitor, and diagnose components in the optical transceiver. The transfer from the pointer to the non-volatile memory is done in a time shorter than a period where the host system sends one MDIO frame on the MDIO bus to the MDIO interface. Accordingly, the ordinary procedures of the CPU are not interfered by the construction of the new micro program on the non-volatile memory.

Another aspect of the present application is a method to revise a micro program from a host system, where the micro program is stored and executed in an electronic apparatus. The method includes steps of: (a) receiving a data constituting the new micro program from the host system in a pointer allocated in the MDIO space through the MDIO bus, the MDIO interface, and the first bus; (b) transferring the data from the pointer to the non-volatile memory to construct an image of the new micro program on the non-volatile memory; and (c) recovering the new micro program from the non-volatile memory in the flash ROM through the second bus.

The transfer of the data from the pointer to the non-volatile memory is carried out with a time shorter than a period where the host system sends one MDIO frame to the MDIO interface on the MDIO bus. The CPU finally recovers the new micro program constructed on the non-volatile memory in the flash ROM. Accordingly, the construction of the new micro program on the non-volatile memory may be done without interrupting ordinary procedures of the CPU to monitor and/or diagnose components in the electronic apparatus.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

The MDIO protocol will be first described. When the host system reads a data from a pointer (also referred to as an address) set in a memory in an electronic apparatus, the host system first sends to the MDIO interface an MDIO frame that includes the operation code ADDRESS, the device code identifying the devices in the electronic apparatus, and the address of the pointer. When the pointer (or address) is set in the memory or the register, the address in the MDIO frame indicates one of addresses of the memory, or one of the registers. In the present specification, the register is distinguished from the memory where the register has a function to perform arithmetic operations; while, the memory has a function only to store and read data.

The MDIO interface (a) selects the device identified by the 5-bit device address DEVAD, and transfers the address just received to the selected device through the internal bus, (b) receives from the selected device the data stored in the pointer defined in the address of the selected device through the internal bus, and (c) temporarily holds the data in the MDIO interface. The host system subsequently sends to the MDIO interface the next MDIO frame that includes the operation code READ. The MDIO interface carries the data temporarily held in the MDIO interface on the MDIO bus just after receiving the turn-around bit (TA) involved in the next MDIO frame. The host system may thus read a data stored in the device.

When the host system writes a data in a pointer set in the memory or the register, the host system first sends to the MDIO interface an MDIO frame that includes the operation code ADDRESS, the device address, and the address of the pointer subject to the writing. The MDIO interface transfers thus received the address to a device identified by the device address. Then, the host system sends to the MDIO interface the next MDIO frame that includes the operation code WRITE and a data to be written. The MDIO interface, receiving the next MDIO frame, extracts the data to be written and transfers this extracted data to the device selected by the device address through the internal bus. The CPU writes thus received data in the pointer whose address is previously transferred from the MDIO interface. The host system thus writes a data in the pointer.

The host system instructs the optical transceiver to monitor and diagnose components implemented within the optical transceiver by writing a data with a preset pattern in a pointer allocated in the memory, the register, or other devices whose address is predetermined, where the preset pattern is often called as the command data and the pointer is called as the command register. Accordingly, the communication between the MDIO interface and the CPU is carried out by the two steps, that is, the first step of setting the address identifying the predetermined pointer in the register, the memory, or other devices; and the second step of instructing READ or WRITE data from/to the pointer.

The CPU may provide a random access memory (RAM) and a ROM (read only memory). The ROM is often a type of the flash memory. The RAM generally has a size smaller than that of the flash ROM but the access time thereof or the time to write data is far faster than that of the flash ROM. The flash ROM is usually composed of several blocks and the data writing inevitably accompanies with the erasure of the whole block prior to the writing. Specifically, when the flash ROM has a total size of, for instance, 256 kilo-bytes accompanied with four blocks, the data writing is necessary to erase all 64 kilo bytes in the block. This means that the flash ROM has a writing time longer than, for instance, 100 μs although the time to read a data there from is shorter than, for instance 1 μs Accordingly, the RAM, or the register, is often used as a temporary register to store data during the execution of the micro program. On the other hand, the flash ROM is used for storing the micro program and parameters used during the execution of the micro program as constants. The CPU, by executing the micro program in the flash ROM, may control, monitor, and diagnose the components implemented in the optical transceiver and perform the communication with the host system through the internal bus and the MDIO bus. The host system often needs to revise the micro program in the flash ROM to enhance the performance of the optical transceiver. However, as explained, the flash ROM needs a time longer than 100 μs for rewriting, which is unpractical to rewrite the micro program during the ordinary operation of the CPU.

Next, some embodiments of the present application will be described as referring to drawings.

First Embodiment

Figure 1:
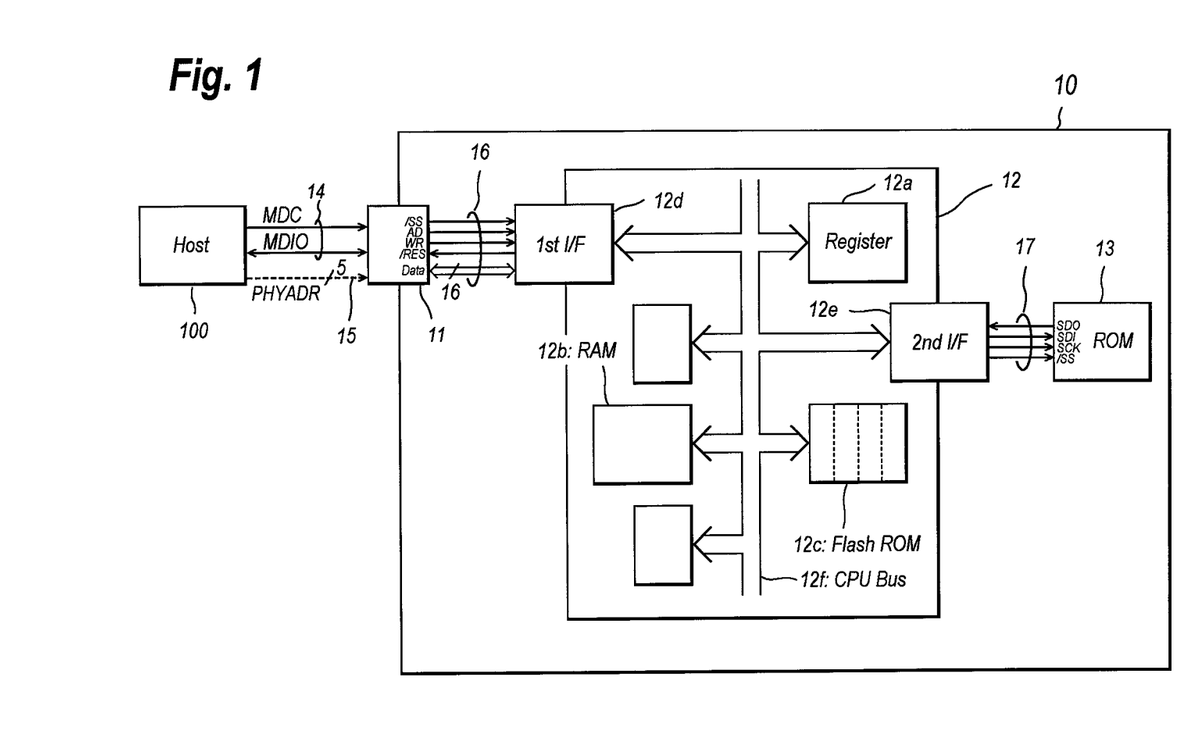
FIG. 1 is a functional block diagram of an optical transceiver according to an embodiment of the present application.

FIG. 1 is a functional block diagram of an optical transceiver 10 of an embodiment of the present application. The optical transceiver 10 includes an MDIO interface 11, a CPU 12, and a non-volatile memory 13. The CPU 12 includes registers 12a, a random access memory (RAM) 12b, a read only memory (ROM) 12c, which is a flash ROM in the present application, a first interface 12d, a second interface 12e, and some other functional units such as a digital-to-analog converter, an analog-to-digital converter, a timer, and so on. These functional units, 12a to 12e, are connected through the CPU bus 12f.

The CPU 12 may provide a plurality of registers 12a each having the function same to each other including arithmetic operations, which are often called as the general purpose register. As described, the RAM 12b and the register 12a have the access time to write a data thereat far faster than that of the flash ROM 12c. As for the reading, the access time of the flash ROM 12c is comparable with that of the RAM 12b or the register 12a. The RAM 12b includes a space to store data temporarily, that is, the data stored in the RAM 12b, or the register 12a, is frequently rewritten during the execution of the micro program; while, the flash ROM 12c holds the micro program currently executed and some constants used in the micro program. The data stored in the flash ROM 12c is rewritable in the unit of the block by interrupting the operation of the CPU 12. The flash ROM 12c of the present application provides four (4) blocks.

The MDIO interface 11 is coupled with the host system 100 through the MDIO bus 14; while, the MDIO interface 11 is coupled with the first interface 12d in the CPU 12 through the internal bus 16, namely the first bus, and the CPU 12 in the second interface 12e thereof is coupled with the non-volatile memory 16 through the another internal bus 17, namely the second bus. In the present application, the RAM 12b may allocate an address space including a plurality of pointers to which the host system 100 may access through the MDIO interface 11, namely, the subject to the MDIO interface 11. Such a space will be called as an MDIO address in the present specification. In an alternative, the CPU 12 may allocate such pointers in the register 12a instead of the RAM 12b.

The optical transceiver 10 generally has a function to convert electrical signals provided from the host system 100 into optical signals corresponding to the electrical signals, and outputs thus converted optical signals to an external optical waveguide, for instance, an optical fiber. Concurrently, the optical transceiver 10 receives an optical signal from an external waveguide and converts the optical signal into an electrical signal and transmits thus converted electrical signal to the host system 100. Accordingly, the optical transceiver 10 provides, in addition to the MDIO interface 11, the CPU 12, and the non-volatile memory 13; electronic circuits including a pre-amplifier, a driver, a clock and data recovery, a transmitter optical sub-assembly (TOSA), a receiver optical sub-assembly (ROSA), and a power supply, and so on; where FIG. 1 omits those components. The CPU 12 monitors, controls, and diagnoses those electrical components of the clock and data recovery, the driver, the pre-amplifier, the power supply, and so on; and those optical elements of the TOSA and the ROSA. The CPU may store diagnostic results of those electrical and optical components in pointers in the RAM 12b, and periodically rewrites the parameters for the control and diagnose the components in the RAM 12b.

The optical transceiver 10 communicates with the host system 100 through the MDIO interface 11 and the MDIO bus 14. Specifically, the MDIO bus 14 is a two-wired interface of the clock MDC and the data MDIO. The clock MDC is unilaterally provided from the host system 100 but the data MDIO is transferred bilaterally.

Figure 2:
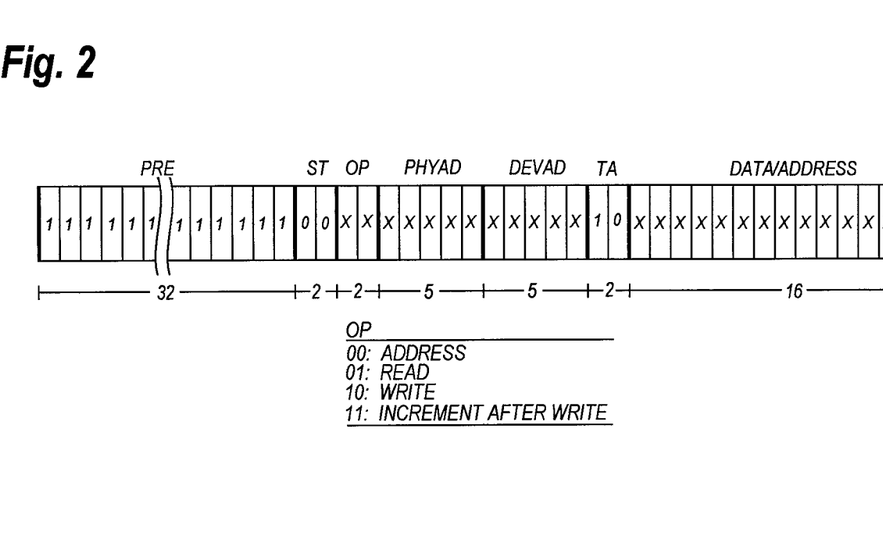
FIG. 2 is a configuration of one MDIO frame.

FIG. 2 shows a configuration of one MDIO frame, which follows the standard of IEEE 802.3 Clause 45, titled by CFP MSA management interface specification. In FIG. 2, PHYADR of 5 bits defines the physical address of the device subject to the communication, namely, the optical transceiver 10 in the present application. The standard above explained allows that 32 optical transceivers at most may participate in one MDIO bus 14. The host system 100 may identify one of the optical transceivers connected in the MDIO bus 14 by setting a unique address by 5-bit PHYADR.

Referring to FIG. 1 again, 5-bit PHYADR 15 are used to assign the physical address in the target optical transceiver. Accordingly, the 5-bit PHYADR 15 make no contribution to the communication between the host system 100 and the optical transceiver 10. For instance, when only one optical transceiver participates in the MDIO bus 14, and/or when the physical address of the transceiver is set in advance to the practical communication through the MDIO bus 14, the 5-bit PHYADR 15 are unnecessary.

The MDIO interface 11 communicates with the CPU 12 through the first bus 16. Specifically, the MDIO interface 11 selects the CPU 12 by the 5-bits device address DEVAD subsequent to PHYADR in the MDIO frame provided from the host system 100 through the MDIO bus 14. Then, the MDIO interface 11 may read from and/or write one data to the CPU 12 selected by the device address DEVAD and a pointer identified by the address/data in the MDIO frame.

The communication between the MDIO interface 11 and the CPU 12 on the first bus 16 is further described. The optical transceiver 10 shown in FIG. 1 provides a parallel bus 16 as the first bus including four control lines of /SS, AD, WE and /RES, and 16 data lines. The signal with the slash in the head thereof means that the signal is attributed with the negative logic; while, the signals without the head slash have the positive logic.

The signal /SS is the interruption. Specifically, the MDIO interface 11 sets the signal /SS in LOW to interrupt the CPU 12. The CPU 12, detecting the assertion of the signal /SS, namely set in LOW, carries out the communication on the parallel bus 16.

The data transmitted on the data lines in parallel is an address identifying a pointer corresponding to one of registers 12a or one of specific address in the memory 12b; or a data with the 16-bit length to be stored in the pointer. The signal AD defines whether the data on the data lines is the address or the data. When the signal AD is set in LOW, the data on the data lines is the address to identify one of pointers in the registers 12a, the specific address in the memory 12b, or other devices; while, the signal AD is set in HIGH, the data on the date lines is the data to be written in the pointer; or a data read out therefrom. Two modes, namely, WRITE and READ may be distinguished by the signal WR. When the signal WR is set in LOW, the mode is WRITE, where the data on the data lines is to be written in the pointer; on the other hand, when the signal WR is set in HIGH, the mode is READ and the data on the data lines is read from the pointer.

The signal /RES is sent from the CPU 12 to the MDIO interface 11. That is, the CPU 12, when the instructions are completed, notifies the MDIO interface 11 that the CPU 12 becomes ready to receive the next instruction. For instance, the MDIO interface 11, detecting that the signal /RES is asserted, sends the next instruction to the CPU 12.

The CPU 12 communicates with the non-volatile memory 13 through the second interface 12e and the second bus 17. The optical transceiver 10 shown in FIG. 1 provides the second bus 17 of the type of Serial Peripheral Interface (SPI) that includes signal liens of /SS, SCK, SDI and SDO. In the SPI 17, the CPU operates as the master device; while, the non-volatile memory 13 is set in the slave device. Three signals of /SS, SCK, and SDO are sent from the CPU 12, while, the signal SDO is provided from the non-volatile memory 13. Although the SPI generally allows a plurality of slave devices, the signal /SS may specify one of slave devices and the master device communicates only with the specified slave device.

Procedures, where the host system 100 rewrites the flash ROM 12c with a new micro program through the MDIO bus 14, will be described. The size of the micro program is usually limited to the size of the flash ROM 12c, for instance, the size of the micro program is several scores to several hundreds of kilo-bytes. The MDIO protocol is fundamentally composed of the frame, and one frame includes only two bytes, 16 bits. Accordingly, when a micro program is revised, the host system 100 is required to rearrange the new micro program by the unit of two bytes, to set the rearranged micro program on respective frames, and to send the frames to the MDIO interface 11. Moreover, the sending of the micro program is done in intervals between the processes where the CPU 12 preforms the ordinary operation to control, monitor, and diagnose the components in the optical transceiver 10. The MDIO bus 14 is originally provided in the optical transceiver 10 to send and/or receive commands and results of the ordinary operation to/from the host system 100.

The MDIO interface 11, receiving the MDIO frame from the host system 100, communicates with the CPU 12 according to the operation contained in the MDIO frame. Referring to FIG. 2, when the operation code OP is "00" in binary, which means that the address/data in the current MDIO frame is the address and to set the address in the target device identified by the 5-bit device address DEVAD, the MDIO interface 11 converts the serial data DATA accompanied with the address/data into a parallel data, sets thus converted parallel data on the data lines, sets the signal AD in LOW to notify that the data on the data lines is the address, and finally sets the command /SS in LOW to make an interrupting request to the CPU 12. Then, the CPU 12 fetches the data on the data lines and identifies one of the pointers in the MDIO space of the RAM 12b subject to the operation. When the mode is READ/WRITE to read or write a data from or to the pointer in the MDIO space specified by the address sent antecedent to the data, the MDIO interface 11 performs the same operation by setting the command AD in HIGH.

One specific pointer in the MDIO space of the memory 12b is allocated as a command pointer. The host system 100, by setting a specific code on this command pointer, instructs the optical transceiver 10 to carry out the procedures defined in the specific code in the command pointer. Also, another one specific pointer in the MDI space of the RAM 12b is allocated as a revision pointer. The host system 100 writes new code constituting the new micro program in this revision pointer through the MDIO bus 14 and the MDIO interface 11.

Viewing the MDIO interface 11 and the internal bus 16 from the CPU 12, the CPU 12 is periodically interrupted by the command /SS from the MDIO interface 11 and requested to execute instructions. Respective instructions are to control, monitor, and diagnose the optical transceiver 1 or to revise the micro program.

Figure 3:
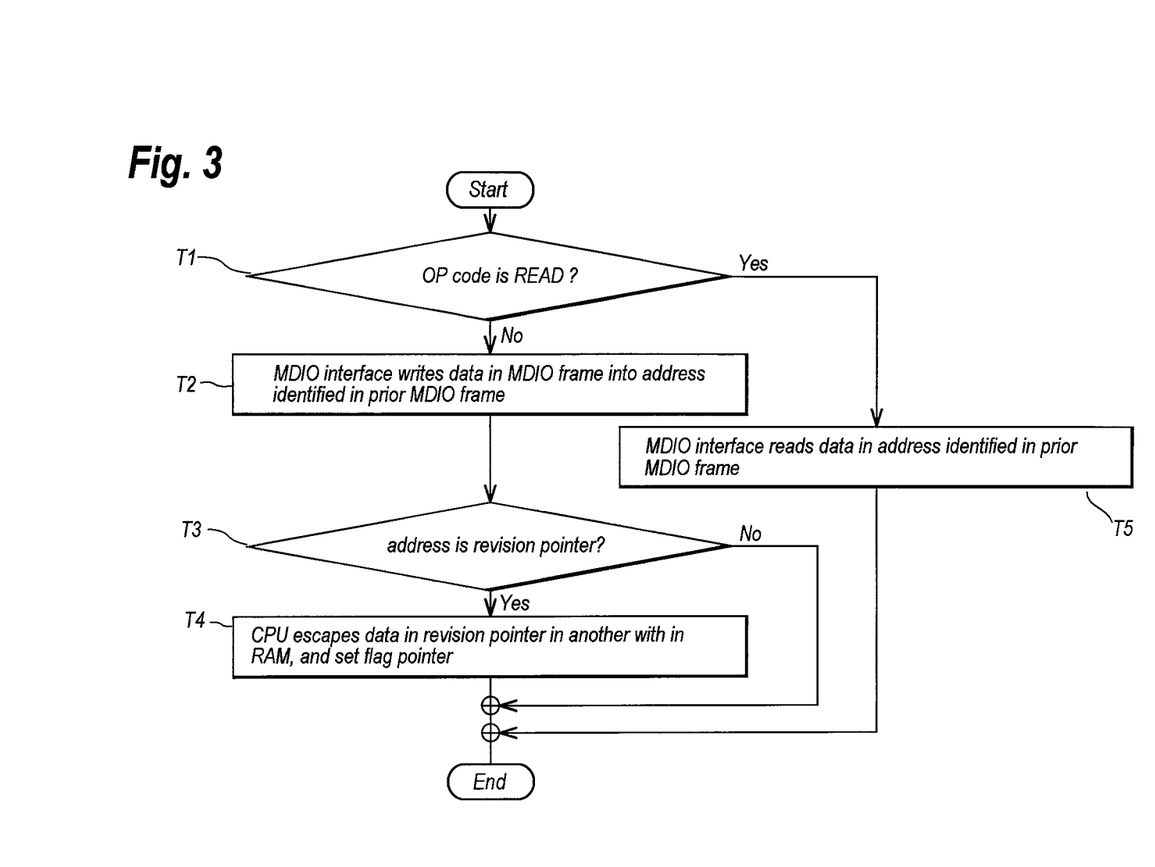
FIG. 3 is a flow chart of the interruption procedure triggered by the MDIO interface to the CPU.

FIG. 3 is a flow chart of the procedures for the CPU 12 to respond the interruption triggered by the MDIO interface 11 by the command /SS. The CPU 12 first determines the instruction is to read a data out from or to write a data in the pointer by the control signal WR at step T1. Then, when the instruction is READ (Yes), the CPU 12 reads the data from the pointer whose address is specified by the prior MDIO frame, and sends the read data to the MDIO interface 11 on the data lines at step T5.

On the other hand, when the instruction is WRITE, the CPU 12 writes the data on the data lines in the pointer whose address is specified by the prior MDIO frame. In particular, when the revision pointer is identified in the prior MDIO frame, the CPU 12 not only writes the data in the pointer but transfers the data written in the revision pointer into another address of the RAM 12b outside of the MDIO space. Because the temporal address is inaccessible from the MDIO interface 11, the data in the temporal address is never overwritten by the MDIO interface 11. Concurrently with the transfer of the data to the temporal address, the CPU 12 sets a preset pattern in flag pointer which is allocated within the MDIO space of the RAM 12b at step T4. The pointer setting the flag is called as the flag pointer.

In a case where the host system 100 sets the address subject to the operation except for the revision pointer, the CPU 12 passes step T4. Thus, the CPU 12 completes the procedures to write data contained in one MDIO frame in the pointer in the MDIO space of the RAM 12b.

Step T4 above described to transfer the data written in the revision pointer to the temporal address is done within a few micro-seconds through the CPU bus 12f. Accordingly, even the MDIO interface 11 sends the next data to be written in the revision pointer, the prior data in the revision pointer is already transferred to temporal address of the RAM 12b, the data is securely held in the RAM 12b even the MDIO interface 11 overwrites the revision pointer. The MSA defines the minimum period for the communication with the host system 100 to be 16 µs, which is enough long for the CPU 12 to transfer the data from the revision pointer to the temporal address of the RAM 12b.

The RAM 12b, which is generally a type of the high speed memory, is used for executing the micro program. The revision pointer preferably has a size minimum to store one revised data, namely, two (2) bytes. Although a larger space for the temporal address may be allocated in the RAM 12b, an area for whole micro program, which becomes several scores to several hundreds of kilo-bytes, is practically hard to be allocated in the RAM 12b. Accordingly, the non-volatile memory 13 with an enough size for the micro program is prepared, and the data stored in the revision pointer or the temporal address is transferred to the non-volatile memory 13 through the second bus 17.

Figure 4:
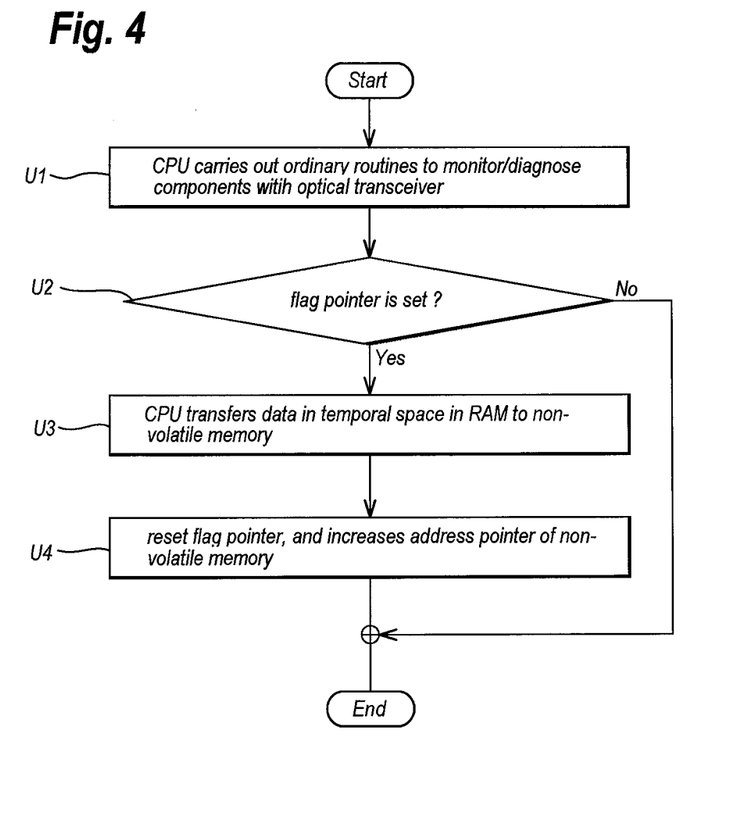
FIG. 4 is a flow chart to transfer a data from RAM in the CPU to the non-volatile memory set outside the CPU.

FIG. 4 is a flow chart to transfer the data stored in the revision pointer to the non-volatile memory 13. The CPU 12, completing the procedures of the interruption triggered by the signal /SS, shown in FIG. 3, recovers the ordinary process to control, monitor, and diagnose the components in the optical transceiver 10 at step U1. At the every completion of the monitoring and diagnosing process, the CPU checks the flag pointer in the MDIO space. When the flag is set, for instance, when the flag is a binary "1", which corresponds to "YES" in step U2 and corresponds to a state where a data for the new micro program is set in the revision pointer, the CPU 12 transfers the data in the revision pointer to the non-volatile memory 13 through the second interface 12e and the second bus 17, at step U3. Then, the CPU 12 resets the flag pointer and increases the memory pointer of the non-volatile memory by one at step U4. The memory pointer is allocated also in the RAM 12b but unnecessary to be within the MDIO space. In a case where the flag pointer is left reset at step U2, the CPU 12 passes the procedures to transfer the data from the revision pointer to the non-volatile memory 13, and iterates the monitoring/diagnosing procedures. Although the description above concentrates on a case where the data for the new micro program is stored in the revision pointer, the CPU may transfer the data from the temporal address in the RAM 12b to the non-volatile memory 13.

The transfer of the data to the non-volatile memory 13 on the second bus 17 is carried out by the procedures of; converting the data into a serial form, and concurrently providing the serial clock SCK and thus converted serial data on the second bus 17. An auto-increment mode may be applicable to transfer the data to the non-volatile memory 13. That is, the CPU 12 prepares in the RAM 12b the first address of the non-volatile memory 13 to be stored in the transferred data for the new micro program, and increases the pointer indexed by the data in the memory pointer of the RAM 12b by a preset width after completing the transfer of one data, which is often called as auto-increment after writing.

After the host system 100 sends the data for the new micro program sequentially, the CPU 12 recovers the data on the non-volatile memory 13 in the form before they are converted into the serial data. The one transfer of the data from the revision pointer to the non-volatile memory 13 is necessary to be done within a period less than 16 µs, which is defined by the MSA as the minimum instruction period. Then, the non-volatile memory 13 is necessary to have an access time to write data of several microseconds.

As described, when the non-volatile memory 13 has an access time comparable to the minimum period of the instruction, which is defined to be 16 µs in the MSA, the optical transceiver 10 may perform the transfer of the data stored in the revision pointer to the temporal address also in the RAM 12b but outside of the MDIO space, and transfer the data stored in the temporal address to the non-volatile memory 13 within a time less than 16 µs which is the period of one MDIO frame defined in the MSA for the communication between the MDIO interface 11 and the host system 100. The host system 100 may revise the new micro program in the non-volatile memory 13 without interrupting the ordinary communication between the MDIO interface 11 and the host system 100.

The minimum period of 16 µs for one MDIO frame may be varied, or shortened, depending on the future development and advance of devices attributed to the communication between the host system 100 and the optical transceiver 10. For instance, because the minimum period of 16 µs corresponds to a period within which the host system 100 sends one MDIO frame on the MDIO bus 14. That is, the transfer of the data from the revision pointer to the temporal address, and the transfer of the data from the temporal address to the non-volatile memory 13 may be carried out within a period during which the host system 100 sends one MDIO frame to the MDIO interface 11 on the MDIO bus 14.

After the data are set in the non-volatile memory 13 as the form of the new micro program, the CPU 12 recovers the new micro program from the non-volatile memory 13 into the flash ROM 12d to execute the new micro program. The host system 100, after the whole data for the new micro program is sent to the optical transceiver 10, resets the optical transceiver 10 by sending an instruction corresponding to the reset on the MDIO bus 14. Specifically, the host system 100 sends two MDIO frames that define the address of the command pointer and the data corresponding to the restart.

Figure 5:
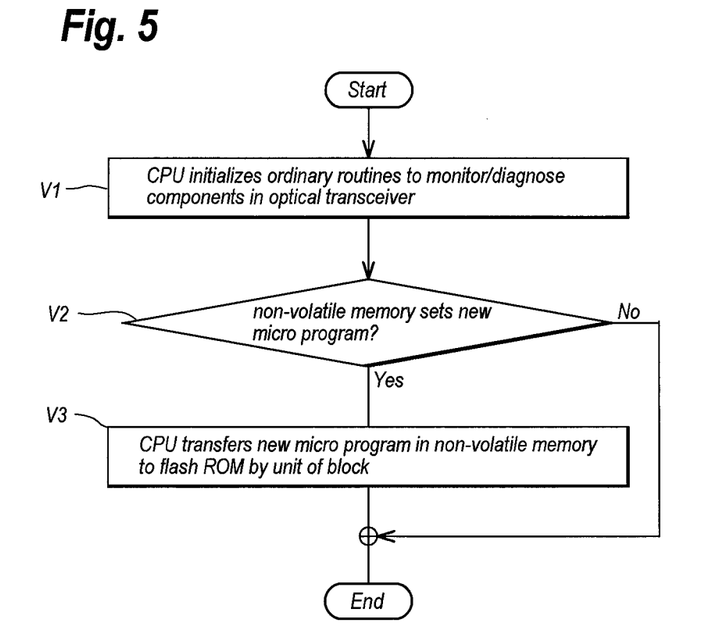
FIG. 5 is a flow chart to transfer a new micro program constructed in the non-volatile memory to the flash ROM in the CPU.

FIG. 5 is a flow chart of the procedures after the CPU 12 receives the instruction of the restart from the host system 100. First, the CPU 12 initializes itself at step V1 to control, monitor, and diagnose components implemented within the optical transceiver 10. Then, the CPU 12 confirms through the second internal bus 17 whether the non-volatile memory 13 stores the new micro program or not, at step V2. When the non-volatile memory 13 stores the new micro program, the CPU 12 transfers this new micro program to one block in the flash memory 12c at step V3. The CPU 12 takes 100 µs or more for erasing the block prior to the writing of the new micro program, which is far longer than the minimum period of the one MDIO frame, and recovering the whole new micro program from the non-volatile memory 13 to the flash memory 12c. However, during the initializing, the optical transceiver 10 is unnecessary to communicate with the host system 100 until the components in the optical transceiver 10 are ready for the practical operation. When the non-volatile memory 13 dose not store the new micro program, the CPU 12 completes the initializing process and iterates the ordinary procedures to control, monitor, and diagnose the components.

Figure 6:
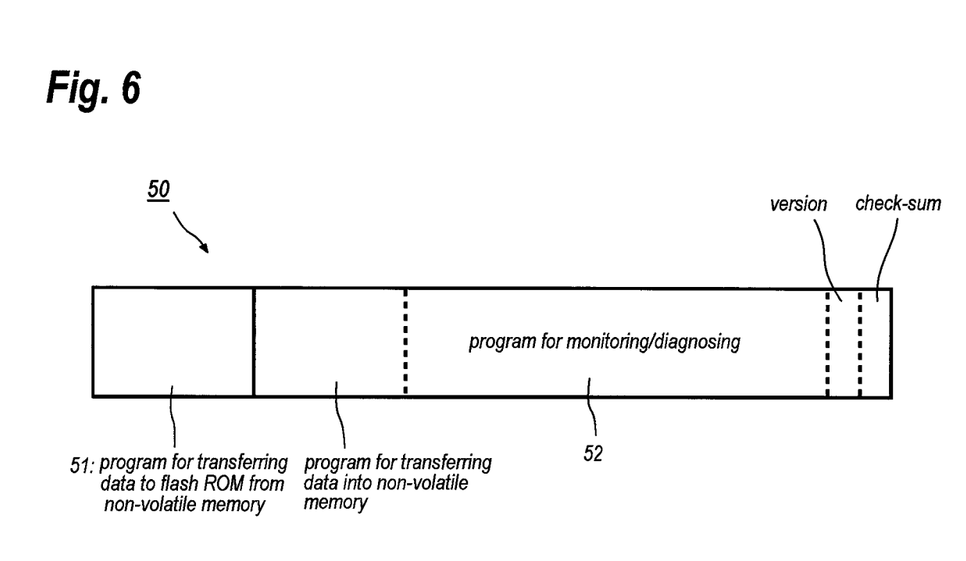
FIG. 6 is a configuration of the micro program.

FIG. 6 shows an example of an arrangement of a micro program. The micro program 50 includes a header 51 and a body 52. The header 51 is never revised. The header 51 stores the program to recover the new micro program from the non-volatile memory 13 to the flash memory 12c. The CPU 12 executes the header 51 just after the restart thereof to recover the new micro program from the non-volatile memory 13 to the flash memory 12c. The body 52 corresponds to the revised new micro program. The body 52 includes a portion, by which the CPU 12 executes the procedure shown in FIGS. 3 and 4, that is, the transfer from the revision pointer to the temporal address, and the transfer from the temporal address to the non-volatile memory 13; or from the revision pointer directly to the non-volatile memory 13.

The body 52 further includes revision information and a checksum of the new micro program. The CPU 12 compares the revision information in the body 52 with the information, which is stored in the RAM 12b and reflects the revision of the micro program currently executed. When the revision information in the body 52 is older than the revision information currently stored in the RAM 12b, the CPU does not advance the recovery of the micro program from the non-volatile memory 13 to the flash ROM 12c.

Next, a function and an advantage of the checksum will be described. The check-sum is used for checking whether the new micro program is correctly stored in the non-volatile memory 13 or the flash ROM 12c. When the CPU 12 finds through the check-sum, that the new micro program is correctly transferred from the host system 100, the CPU 12 recovers the new program from the non-volatile memory 13 to the flash ROM 12c. While, the CPU finds that the sum of the codes of the new micro program is inconsistent with the checksum, the CPU ceases the recovery of the micro program and sends an alarm to the host system 100.

Figure 7:
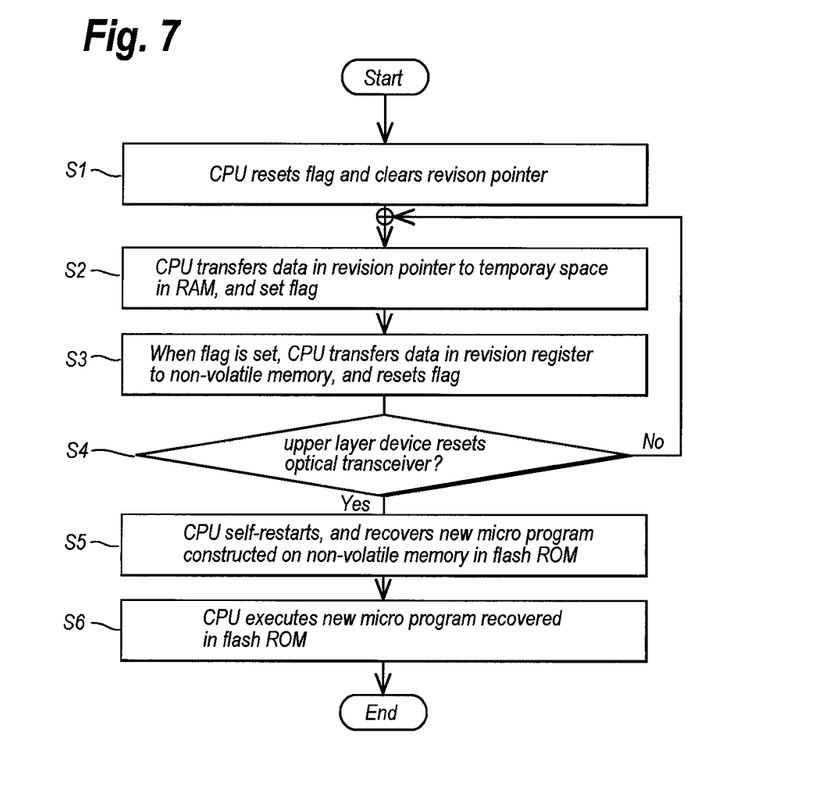
FIG. 7 is a flow chart to rewrite the micro program of the embodiment.

FIG. 7 shows a flow chart to revise the micro program according to an embodiment. The CPU 12 initializes the flag pointer and the memory pointer for the non-volatile memory 13 at step S1 after asserting the reset, or the power-on. In revising procedures, the CPU 12 iterates steps S2 to S4. That is, step S2 performs an interruption triggered by the MDIO interface 11 by asserting /SS, and step S3 transfers a data stored in the RAM 12b to the non-volatile memory 13.

Figure 8:
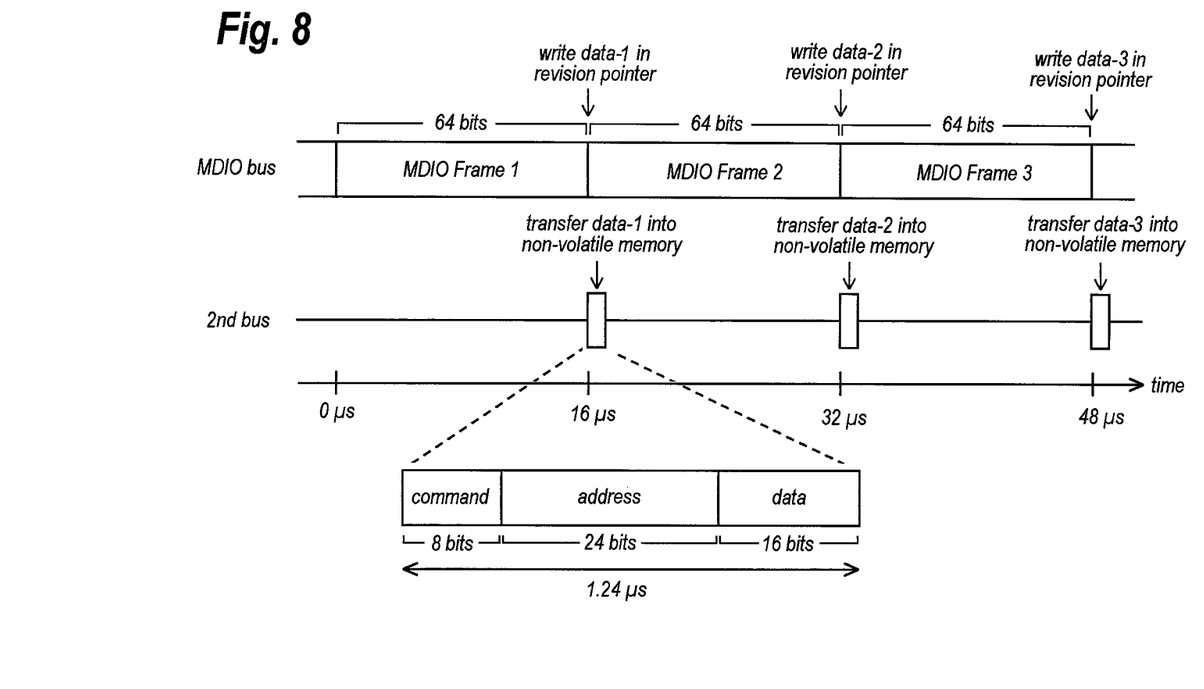
FIG. 8 is a time chart of the MDIO bus set outside of the optical transceiver and the other bus implemented within the optical transceiver.

FIG. 8 is a time chart showing a data flow on the MDIO bus 14 and the second bus 17 when the CPU 12 iterates steps S2 to S4. The MDIO bus 14 carries data including the new micro program from the host system 100 by a minimum period of 16 µs. The CPU 12 completes step S2, namely, the writing of data 1 contained in the MDIO frame 1 into the temporal address in the RAM 12b during the first MDIO frame 1. The CPU 12 further completes, during the second MDIO frame 2, to transfer the data in the temporal address of the RAM 12b into the non-volatile memory 13. The present embodiment is implemented with the SPI bus as the second bus 17, and FIG. 8 exemplary illustrates a case that the CPU 12 writes the data into the non-volatile memory 13 by a frame of 48 bits of the SPI. The SPI in the transmission speed thereof reaches 40 Mbit/s, and 48 bits data are transferred to the non-volatile memory 13 by about 1.24 µs. Thus, even the host system 100 sends one MDIO frame by the period of 16 µs, the CPU carries out the steps S2 and S3 sequentially. Moreover, the CPU 12 has an enough time to carry out the ordinary operation to monitor/diagnose the components after the transfer of the data from the temporal space to the non-volatile memory 13.

Referring to FIG. 7 again, after the completion of the transfer of the data into the non-volatile memory 13, the host system 100 resets the optical transceiver 10 at step S4; then, the CPU 12 recovers the new micro program from the non-volatile memory 13 to the flash ROM 12d at step S5. As already described, the header 51 of the micro program is allocated to store this initializing process. Also, step S5 carries out the comparison of the revision information and the check-sum.

After the CPU recovers the new micro program into the flash ROM 12d, the CPU 12 executes this new micro program to control, monitor, and diagnose the internal components at step S6.

Second Embodiment

Figure 9:
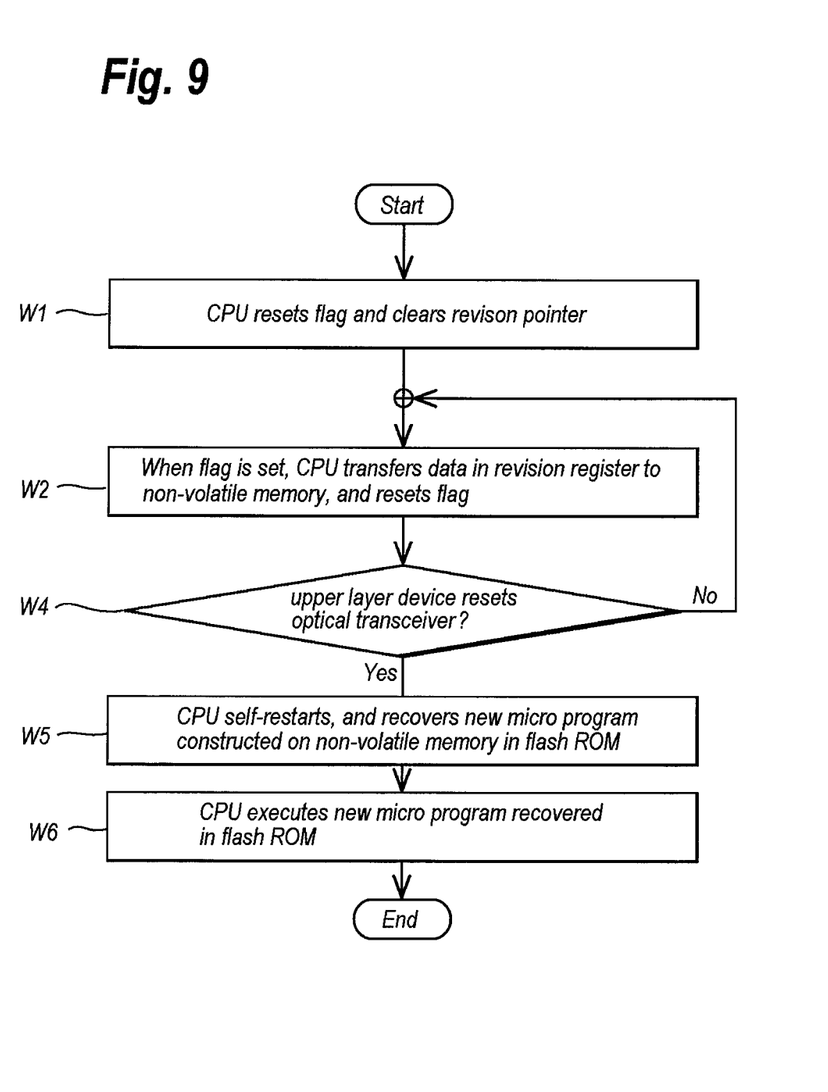
FIG. 9 is a flow chart of the micro program in the optical transceiver of the second embodiment.

As already described, the embodiment concentrates on a procedure that the data stored in the revision pointer in the MDIO space is first transferred to the temporal address in the RAM 12b but outside the MDIO space, then, the data in the temporal address is transferred to the non-volatile memory 13. However, one step process, that is, the data in the revision pointer is directly written in the non-volatile memory 13 just after the setting of the data in the revision pointer by the MDIO interface 11. FIG. 9 is a flow chart to revise the micro program in the optical transceiver when the CPU 12 has a limited RAM 12b, that is, the RAM 12b has no room to allocate the temporal address. The flow chart of FIG. 9 combines two steps, S3 and S4, appearing in the flow chart of FIG. 7 into a step W2 that the CPU 12 transfers the data stored in the revision pointer directly into the non-volatile memory 13.

In the aforementioned embodiment, the process to transfer the data stored in the revision pointer to the non-volatile memory 13 is performed by the CPU 12 during a period while the MDIO interface 11 receives the next MDIO frame, which may secure an enough time to transfer the data from the CPU 12 to the non-volatile memory 13. However, installing a non-volatile memory 13 having a faster access time, two steps, S3 and S4, may be simplified in the single step W2. That is, the transfer of the data from the revision pointer to the non-volatile memory 13 may be carried out during a minimum period defined by the MSA when the MDIO interface 11 communicates with the host system 100 to receive the next MDIO frame. Thus, such an algorithm to transfer the data from the revision pointer directly to the non-volatile memory 13 may simplify the program.

Figure 10:
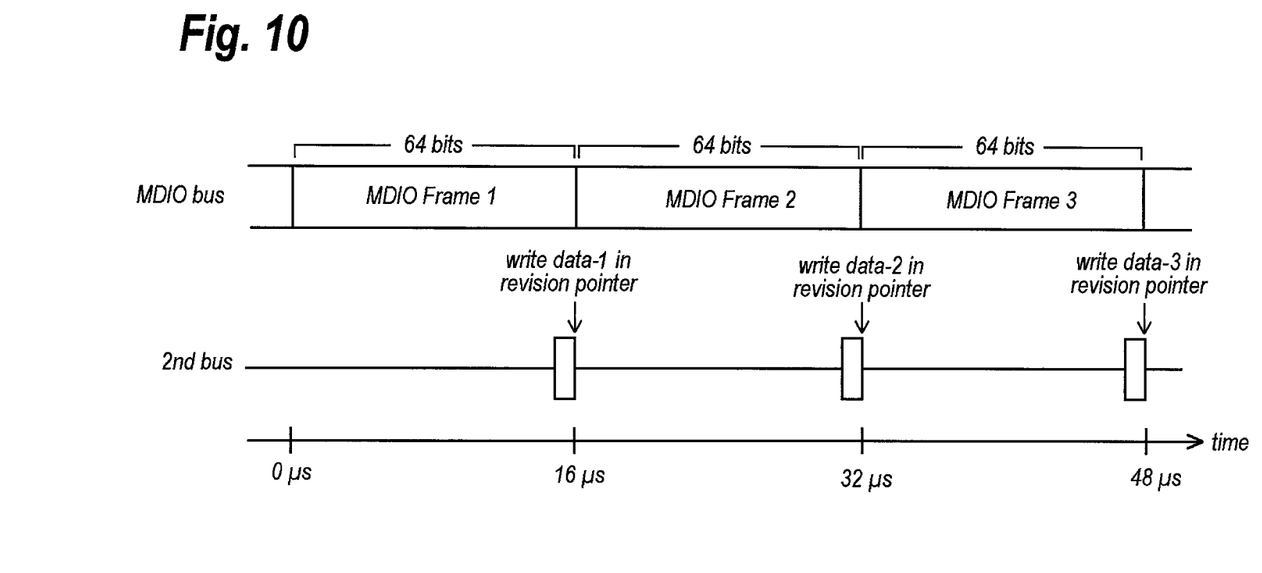
FIG. 10 shows a time chart of the MDIO bus and the other bus of the optical transceiver of the second embodiment.

FIG. 10 is a time chart for the MDIO bus 14 and the internal bus 17 when the CPU 12 iterates the steps, W2 to W4. The CPU 12 transfers the data stored in the revision pointer of the MDIO space to the non-volatile memory 13 during a period where the optical transceiver 10, exactly the MDIO interface 11 in the optical transceiver 10 receives one MDIO frame through the MDIO bus 14.

The arrangements of the optical transceiver of the first and second embodiments are preferably selected based on the practical specification of the transceiver and the design concept of the hardware and the micro program thereof. Specifically, the speed of the internal bus 17, the access time to write a data in the non-volatile memory 13, the clock speed of the CPU 12, a period to monitor and diagnose the components in the optical transceiver, the cost and the power consumption of the circuits, and so on, may be taken into account to select the architecture of the optical transceiver.

Third Embodiment

Figure 11:
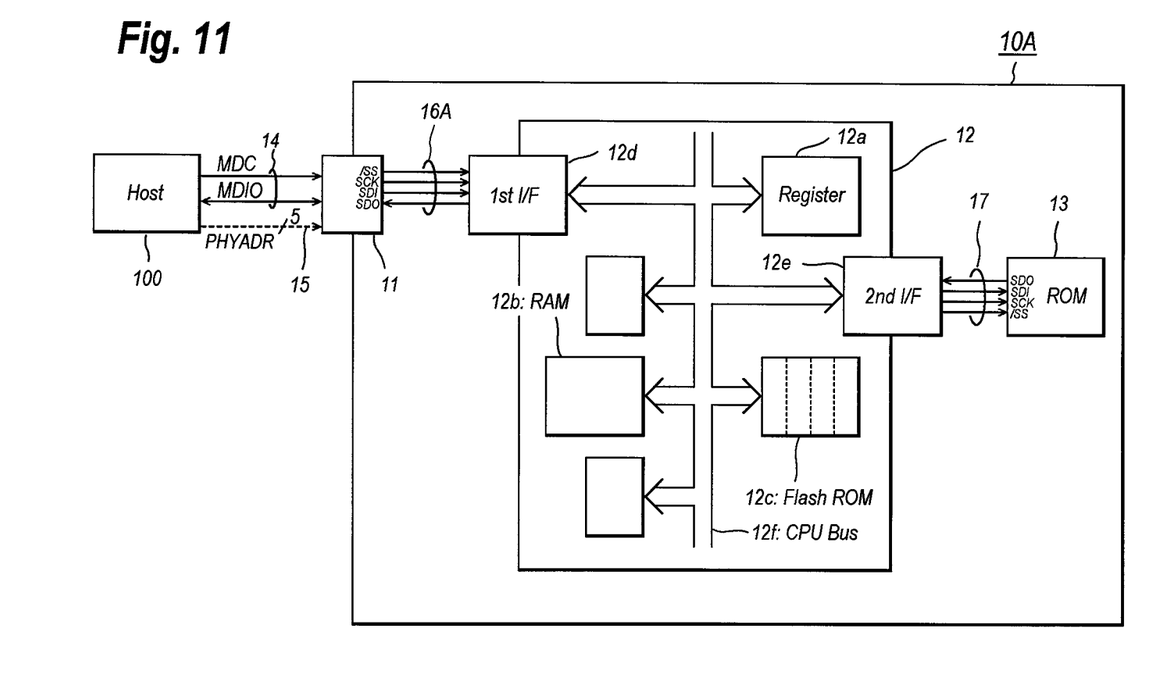
FIG. 11 is a functional block diagram of still another optical transceiver of the third embodiment.

FIG. 11 is a functional block diagram of an optical transceiver according to the third embodiment of the present application. The aforementioned optical transceiver 10 provides the parallel architecture for the first bus 16 to connect the MDIO interface 11 with the CPU 12. The optical transceiver 10A of the present embodiment has a serial bus for the first bus 16A. Specifically, the MDIO interface 11 is coupled with the CPU 12 through the SPI bus including four (4) signal lines, /SS, SCK, SDI, ad SDO.

The optical transceiver 10A provides another SPI bus 17 connecting the CPU 12 with the non-volatile memory 13. The first SPI bus 16A and the second SPI bus 17 are independently operational. Specifically, the CPU 12 becomes the master device, while, the non-volatile memory 13 is the slave device in the second SPI bus 17. On the other hand, the CPU 12 becomes the slave device and the MDIO interface 11 is the master device in the first SPI bus 16A. Three signals, /SS, SCK, and SDI, are sent from the MDIO interface 11 to the CPU 12 in the first SPI bus 16A, while, they are sent from the CPU 12 in the second SPI bus 17. The data SDO is sent from the CPU 12 to the MDIO interface 11 in the first SPI bus 16A, but it is sent from the non-volatile memory 13 to the CPU 12 in the second SPI bus 17.

In the first SPI bus 16A, the MDIO interface 11 starts and completes the serial communication using signals, SCK, SDI, and SDO, with the CPU 12 by setting the interrupt /SS in LOW. The CPU 12, detecting the assertion of the signal /SS, begins the serial communication, and completes the serial communication by detecting the negation of the interrupt /SS. During the negation of the interrupt /SS, the CPU 12 carries out no operation even other lines, SCK, SDI, and SDO, carry the data thereon.

The serial communication of the serial bus 16A between the MDIO interface 11 and the CPU 12 is to send data on the line SDI from the MDIO interface 11 to the CPU 12 and to send data on the line SDO from the CPU 12 to the MDIO interface 11, each synchronizing with the clock on the line SCK.

Specifically, a SDI frame from the MDIO interface 11 to the CPU 12 includes the instruction code of 8-bit length, the address with 8-bit length, and the data with 8-bit length. The instruction code instructs the CPU what type of the operation to be done. The address specifies the register subject to the operation. The binary data is to be written in or read from the register specified by the address. In the present embodiment, the address specifies one of the pointers in the MDIO space; the instruction code defines the mode to write a data to, or to read a data from the pointer. When the mode READ is defined, the CPU 12 puts the data in the pointer specified by the address on the line SDO in serial, and the MDIO interface 11 stores the data on the SDO into the pointer.

Thus, the optical transceiver may provide the internal bus 16A having the architecture of the serial bus by processing the MDIO frame sent from the host system 100 on the MDIO bus 14 so as to have a protocol of the internal serial bus 16A by the MDIO interface 11. For instance, according to the operation code OP in the MDIO frame, which is one of the address setting, the data writing, the data reading, and the data reading with the address increment; the MDIO interface 11 defines the instruction on the serial bus 16A, the address and the data to be processed, and sends thus defined instruction, the address, and the data to the CPU 12. Also, the MDIO interface 11, when the instruction is to read a data stored in the pointer in the MDIO space, reads out this data from the CPU 12 through the output data line SDO.

A distinguishable feature between the parallel bus and the serial bus will be described. First, the serial bus needs only four (4) lines; while, the parallel bus requires twenty (20) lines, which may not only reduce an area prepared for wiring on the circuit board but reduce an area for the CPU 12 because the CPU 12 has limited terminals for the bus. On the other hand, the serial bus is necessary to enhance the clock frequency, for instance, the clock speed ten times faster than that of the parallel bus. Because of the limited clock speed in the parallel bus, the CPU implemented with a parallel bus may be formed by conventional semiconductor devices, which may reduce the cost of the circuit. Also, an integrated circuit (IC) operational with a slower clock speed generally saves power consumption.

Thus, the internal busses, 16 and 17, may be decided in the architecture thereof, namely, the serial bus and/or the parallel bus, based on the practical specification and the design concept of the micro program taking the size and power consumption of the optical transceiver.

While particular embodiments of the present invention have been described herein for purposes of illustration, many modifications and changes will become apparent to those skilled in the art. For instance, the description above concentrates on an optical transceiver which includes a CPU and an MDIO interface to communicate with the host system. However, the concept according to the present application may be automatically applicable to an electronic apparatus that includes a CPU and an MDIO interface to communicate with a device in the upper physical layer. Accordingly, the appended claims are intended to encompass all such modifications and changes as fall within the true spirit and scope of this invention.

What is claimed is:

1. A method of revising a micro program currently executed in an electronic apparatus with a new micro program, the revision being performed from a upper device through an MDIO bus that connects the upper device with the electronic apparatus, the electronic apparatus including an MDIO interface coupled with the MDIO bus, a central processing unit (CPU), and a non-volatile memory, the CPU being coupled with the MDIO interface through a first bus and including a random access memory (RAM) and a flash ROM, the RAM including an MDIO space and the flash ROM storing the micro program that is currently executed, the non-volatile memory being coupled with the CPU through a second bus, the MDIO space being accessible from the upper device, the method comprising steps of:

receiving a data that comprises the new micro program from the upper device in an address in the MDIO space in the RAM through the MDIO interface and the first bus;

transferring the data in the address in the MDIO space to a temporal address in the RAM, the temporal address being outside the MDIO space;

constituting the new micro program in the non-volatile memory by transferring the data from the temporal address in the RAM to the non-volatile memory; and recovering the new micro program from the non-volatile memory in the flash ROM in the CPU through the second bus.

2. The method of claim 1, wherein the new micro program constructed on the non-volatile memory includes a header and a body, the header including a program for the CPU to recover the new micro program constructed on the non-volatile memory into the flash ROM.

3. The method of claim 2, wherein the body includes revision information of the new micro program constructed on the non-volatile memory, the method further including a step of:

after constructing the new micro program on the non-volatile memory but before the recovering the new micro program in the flash ROM, comparing the revision information in the new micro program on the non-volatile memory with information contained in the micro program currently executed and stored in the flash ROM, wherein the CPU does not begin the recovery of the new micro program from the non-volatile memory to the flash ROM when the revision information of the new micro program is older than the information contained in the micro program currently executed.

4. The method of claim 1, wherein the step of transferring the data from the address to the temporal address is carried out within a time shorter than a period where the upper device sends one MDIO frame to the MDIO interface using the MDIO bus.

5. The method of claim 4, wherein the period of one MDIO frame is 16 μs.

6. The method of claim 1, wherein the step of transferring the data from the temporal address to the non-volatile memory is carried out within a time shorter than a period where the upper device sends one MDIO frame to the MDIO interface using the MDIO bus.

7. The method of claim 6, wherein the period of one MDIO frame is 16 μs.

* * * * *